July 23, 1963　　　E. W. ROBERTSON　　　3,098,282
COMBINED RASP AND BRUSH MOUNT
Filed Feb. 13, 1961
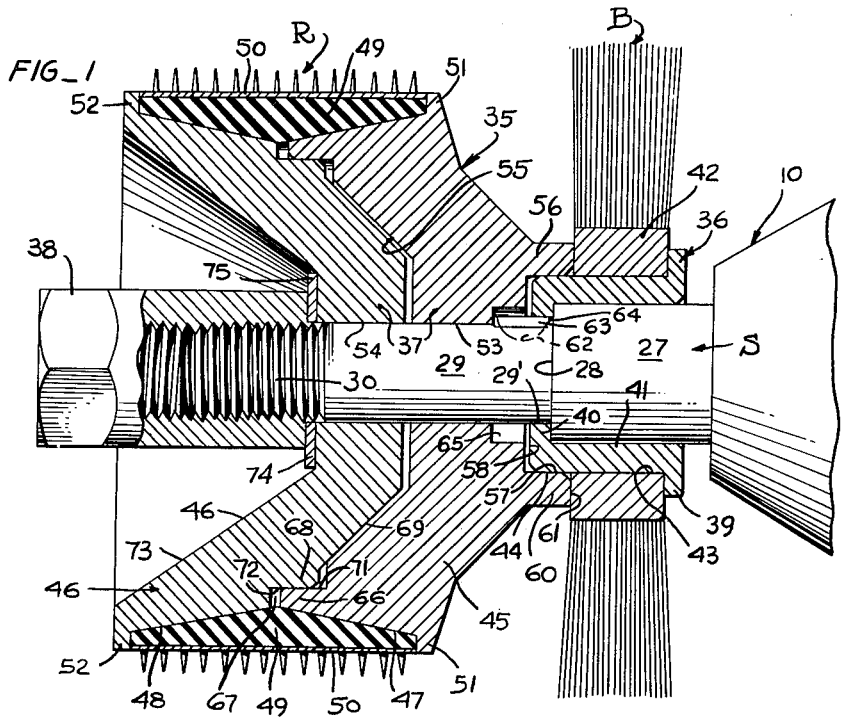
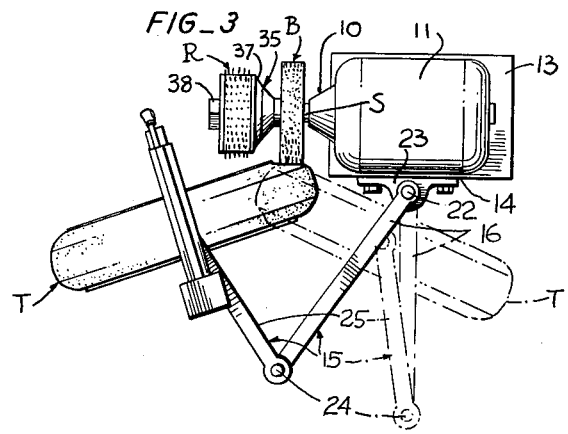
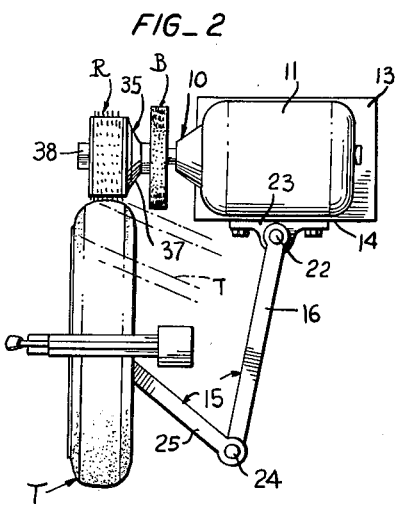
INVENTOR.
ELMER WESLEY ROBERTSON
BY
*Hansen and Lane*
HIS ATTORNEYS วันที่ 3,098,282
Patented July 23, 1963

3,098,282
COMBINED RASP AND BRUSH MOUNT
Elmer Wesley Robertson, Berkeley, Calif., assignor, by mesne assignments, to Elrick Industries, Inc., Oakland, Calif.
Filed Feb. 13, 1961, Ser. No. 88,847
5 Claims. (Cl. 29—78)

This invention relates to tire buffing equipment and more particularly to a rasp and wire brush mount for the arbor of such equipment.

The present invention is particularly adapted for use with buffing equipment of the type in which a tire to be buffed is mounted on a wheel journaled on a spindle carried by an articulatable frame so related with an arbor as to facilitate swinging adjustment of the spindle in a horizontal plane for presenting the tread area of the tire tangentially and angularly to a buffing rasp and brush on said arbor. Such an arrangement is clearly illustrated and disclosed in U.S. Patent No. 2,872,978 which issued to John W. Bakke on February 10, 1959.

From the foregoing disclosure it will be noted that in prior devices the rasping drum is ordinarily mounted on one end of the arbor and the wire brush on the opposite end thereof, the drive or motor of the arbor being between the rasp and the wire brush. Thus it will be seen that the articulatable frame must be swung to different positions between the ends of the arbor in order to completely buff one tire.

The present invention seeks to minimize the extensive movement of the articulatable frame as heretofore required. To this end it is one object of the present invention to provide a combined rasp and wire brush mount adapted to fit the pre-existing stub shaft at one end of the arbor. In other words, it is here contemplated that both the rasp and the wire brush be mounted on one end only of the arbor in proximity to each other yet spaced sufficiently to clear the swingability of the tire so that either the rasp or the brush can be employed with a minimum of shifting of the tire. It will thus be seen that considerable time is saved and loss of energy in the operator preserved thereby cutting the man hour cost of each buffing operation and enabling the operator to buff more tires with a minimum of fatigue.

In order to understand the present invention more clearly it should be borne in mind that the dual mount for both rasp and brush is constructed for connection to an existing arbor shaft. In other words such arbor shaft being relatively short since it is intended for but a single brush or rasp, it cannot normally support both such units. It is therefore another object of the present invention to provide a rasp and wire brush mount accommodating both such units despite the inability of an existing arbor shaft to do so of itself.

To this end it is a further object of the present invention to provide a split drum for supporting a rasp band and coordinated with a brush block clamping means facilitating the securing of both the rasp and drum to an existing arbor shaft with but a single securing bolt on the threaded end of such shaft.

These and other objects of the present invention will become apparent from a reading of the following description in connection with the accompanying drawings in which:

FIG. 1 is an enlarged longitudinal section through a rasp and wire brush mount embodying the present invention as associated with an existing arbor shaft.

FIG. 2 is a reduced plan view of the rasp and wire brush mount of FIG. 1 and illustrating diagrammatically the articulatable frame and wheel support associated therewith.

FIG. 3 is a view similar to that of FIG. 2 illustrating in comparison therewith the ease with which either the rasp or the brush mounted in accordance with the present invention is employed.

Referring to FIGS. 2 and 3 of the drawing, the general arrangement of the buffing equipment will first be described. In this arrangement, reference being had to the aforementioned Bakke patent, an arbor 10 extends from one end of a motor 11 carried on top of a supporting pedestal 13. On one face 14 of the pedestal 13 there is pivotally mounted a horizontally articulatable frame 15 carrying at its extremity a horizontally disposed spindle journaling a wheel (not shown) on which a tire T is mounted for buffing.

The articulatable frame 15 includes an inner arm 16 hinged to the face 14 of the pedestal 13 by means of a vertical hinge pin 22 carried by and between upper and lower brackets (one 23 of which is shown) secured by bolts to the face 14 of the pedestal 13. An upright hinge pin 24 suitably connects the outer end of the arm 16 to the inner end of another arm 25 provided at its outer end with a vertical bearing (not shown) on which the spindle is supported in a manner to facilitate swinging of the spindle, wheel and tire T about the axis of the said vertical bearing. The spindle is powered to turn the wheel and tire in a conventional manner.

By the foregoing arrangement the tire mounted on the wheel and spindle is not only statically supported for presentation tangentially to the arbor but is also swingable in a horizontal plane relative thereto so that the crown contour as well as the shoulder of the tire tread may be prepared for recapping in a well known and conventional manner.

Coming now to the rasp and brush mount of the present invention it should be understood that both the brush B and the rasp R are of conventional design as is the shaft S of the arbor 10. However, it should here be noted that the shaft S is of the existing type and size. That is to say, the shaft S is of such length as to support either a rasp drum or a wire brush but not both. To this end it will be noted in FIG. 1 that the shaft S has a larger diameter at its base end 27 adjacent the motor 11 to provide a shoulder 28 spaced from the motor housing. This shoulder 28 was heretofore employed as an abutment or stop for a brush block or a rasp drum mounted on the reduced end 29 of the shaft S. Here also it will be noted that the reduced end 29 of the shaft S is of a minimum length to receive and support either a brush block or a rasp drum between the threaded end 30 of the shaft S and the shoulder 28 thereof.

With the foregoing in mind we come now to the dual mount for the rasp and wire brush constructed in accordance with the present invention and hereinafter generally designated by reference number 35 in drawing.

The dual mount 35 of the present invention is constructed for the purpose of simultaneously securing both rasp R and the wire brush B to the existing arbor shaft S which would heretofore accommodate only one or the other of these units, namely either the rasp or the brush.

Referring to FIG. 1 it will be noted that the brush B as well as the rasp R is of the usual width required for the purpose each is intended. Moreover, from an examination of FIGS. 2 and 3 in conjunction with FIG. 1 it will be noted that the brush and rasp must be spaced sufficiently along the length of the shaft S to afford independent buffing of a tire by either the brush or the rasp without one interfering with the other. Such spacing of the brush and rasp upon the arbor shaft S necessitates that these two units be spaced from each other a distance which is greater than would be possible on the normal length of the existing shaft.

To compensate for this differential, the present invention contemplates the provision of a dual mount comprising a brush adapter bushing 36 which fits over the larger base end 27 of the arbor shaft S and an offset rasp supporting split drum 37 coordinated with the adapter bushing 36 for simultaneously securing both brush and rasp by a common retaining nut 38 on the threaded end 30 of the shaft S.

The bushing 36 which is cup shaped in form has an outwardly extending flange 39 at one end and an inwardly extending flange 40 at its opposite end, the medial cylindrical wall 41 between them fitting snugly upon the larger base end 27 of the shaft S. The inwardly extending flange 40 has a central opening 29' which slidingly fits the reduced portion 29 of the shaft S and the flange 40 itself abuts the shoulder 28 provided by the larger portion 27 of the shaft S. The outwardly extending flange 39 is slightly spaced from but in proximity to the housing of the motor 11 to provide an inner abutment on the shaft S closer to the motor than is the existing shoulder 28.

The brush B may be of any well known form presenting an annular abrading periphery; for example, the brush B may be well known emery or abrasive coated leaves or sleeve or as shown in the drawing made up of wire bristles of fine texture for buffing the feather edge of the tire shoulder where the crown and side wall of the tire meet. In either case the brush B includes a block 42 having an axial bore 43 dimensioned for sliding fit upon the medial cylindrical wall 41 of the bushing 36. The axial length of the block 42 is less than that of the cylindrical wall 41 so that when one side of the block abuts the flange 39 a portion 44 of the wall 41 is exposed at the other side of the block 42.

The offset rasp supporting drum 37 which is of the split type consists of a base or first cone 45 and a companion or second cone 46 each presenting a half rim periphery, 47 and 48 respectively, for receiving and supporting an annular rubber backing pad 49 upon which the rasp band 50 is to be supported. This is a well known arrangement in which the half rims present diverging faces 47—48 deepest at center so as to provide a shallow V groove, each half rim having an outer marginal flange 51 and 52, respectively, for confining the backing pad 49 between them. When the half rims are pressed together, i.e., toward each other to increase the diameter of the V groove, the rubber backing pad 49 is stretched radially outwardly against the rasp band 50. Moreover, the marginal flanges 51—52 press inwardly against the side edges of the pad 49 to assure outward expansion of the pad whereby the rasp band 50 is firmly held and tensioned to present a relatively solid rasp R.

In order to accomplish the offset dual mount for brush and rasp both first and second cone 45 and 46 is provided with an axial bore 53 and 54, respectively, at its hub or apex zone so as to have sliding fit upon the reduced end 29 of the arbor shaft S. The second cone 46 fits within a conical recess 55 of the first cone 45 and therefore has its hub zone disposed substantially in the same plane as the half rim periphery 47. By this arrangement, the half rim periphery 48 of the companion or second cone 46 is disposed in a plane circumscribing the threaded end 30 of the shaft S and has its marginal flange 52 well outside of or beyond the extreme end of shaft S.

The base or first cone 45 has an annular hub 56 at its apex zone of a diameter greater than the cylindrical portion 41 of the adapter bushing 36 upon which the brush block 42 is mounted. This hub 56 is recessed as at 57 to receive that portion 44 of the adapter 36 which extends beyond the brush block 42. The recess 57 is deeper than the extended portion 44 of the adapter 36 so as to leave a clearance or gap between the bottom 58 of the recess 57 and the end face 59 of the adapter 36. By this arrangement an annular flange 60 is provided on the hub 56 and has its inner face 61 adapted to abut against the brush block for pressing the latter against the outwardly extending flange 39 on the adapter 36.

As best seen in FIG. 1 the adapter 36 is keyed to the shaft S by a key 63 having a portion thereof disposed in a slot 62 formed in the reduced portion 29 of the shaft and a part of the key 63 extending into a slot 64 formed in the inwardly extending flange 40 of the adapter 36. This assures that the adapter 36 will turn with the shaft S. It should here be noted that the hub 56 is provided with a further recess 65 at the bottom or floor of the recess 57 in the hub. This recess 65 provides a complete annular clearance around the shaft 29 in the region of the key 63. Thus it will be seen that neither the brush block 42, nor the cones 45—46 are keyed to the shaft S, they being secured together in vice-like manner between the flange 39 on the adapter and the retaining nut 38 on the threaded end 30 of the shaft S. Here again it should be noted that the base and companion cones 45 and 46 are actually spaced from each other but are united for turning movement with each other by clamp-like action of their respective marginal flanges 51 and 52 with the edges of rubber backing pad 49 and the surface contact of the half rim faces 47—48 of the two cones against the diverging inner faces of the backing pad 49.

As previously stated the hub bore 53 of the base cone 45 has sliding fit upon the reduced portion 29 of the shaft S. The base cone 45 is further stabilized in axial alignment relative to the shaft S by the sliding fit between the inner annular wall of the flange 60 and the cylindrical portion 41 of the adapter 36.

The companion cone 46 while having sliding fit between its hub bore 54 and the reduced portion 29 of the shaft S is also further stabilized axially of the latter. This is accomplished by the sliding fit between a flange 66 formed at the base of the first cone 45 and a recess 67 formed in a projection 68 on the conical face 69 of the companion cone 46. The flange 66 is formed on the first cone 45 by a right angle cut annularly thereof adjacent the base end of this first named cone. This provides an annular inside face 71 on the base cone 45. The projection 68 on the conical face 69 of the companion cone 46 has a right angle cut annularly thereof to provide an annular outside face 72 dimensioned for sliding fit into the annular inside face 71 of the flange 66. In no case is there any engagement between the two cones in a direction parallel to the axis of rotation thereof or the shaft S.

The companion cone 46 is provided with an internal cone shaped face 73 terminating in a flat face 74 (transverse to the axis of the shaft S) adjacent the hub-like apex of the second cone 46. A washer 75 on the threaded end 30 of shaft S covers this flat face 74 to distribute the pressure from the retaining nut 38 over the face 74. Consequently when the retaining nut 38 is tightened up onto the threaded end 30 of the shaft S the companion cone 46 is pressed inwardly toward the base end of the shaft. In this manner the marginal flange 52 on cone 46 bears against the edge of the rubber pad 49 pressing the latter toward the marginal flange 51 on the base cone. Simultaneously therewith the half rim faces 47 and 48 are brought closer together and thereby exert an outward pressure against the diverging faces on the inner side of the rubber pad belt 49.

In addition to the foregoing, the two cones 45 and 46 are pressed inwardly so that the inner face of the hub 56 and/or flange 60 presses firmly against the brush block 42 which in turn is bottomed against the inwardly extending flange 39 on the adapter 36.

From the foregoing it will be seen that both rasp R and brush B are secured in spaced relation on a pre-existing arbor shaft of lesser length than the overall width of the rasp and brush combined. Moreover, the brush and rasp are secured simultaneously by a single retaining means or nut, the rasp foundation band 49 forming a part of the securing means as does the brush block 42.

Referring now to FIGS. 2 and 3 it will be appreciated that by the foregoing arrangement both the crown contour as well as the shoulder feathering of a tire T can be conditioned for recapping all on one side of the arbor. The buffer operator need not swing the tire from side to side of the arbor but can shift the tire, as supported on the swing arms 15 a slight distance in order to accomplish the buffing operation.

While I have described the dual mount for rasp and brush in specific detail it will be appreciated by those skilled in the art that the structure is susceptible to variations, modifications and/or alterations without departing from the scope of my invention. I therefore desire to avail myself of all variations, modifications and/or alterations as fairly come within the purview of the appended claims.

What I claim as new and desire to protect by Letters Patent is:

1. For an arbor shaft of a length to support a single buffing drum or the like, said shaft having an enlarged base end providing an abutment shoulder for such buffing drum and a threaded end spaced from said shoulder a distance accommodating one such buffing drum; a dual mount for a rasp band and a brush block comprising an adapter mounted on said enlarged base to receive and support said brush block and having a shoulder flange spaced inwardly of the shoulder on said shaft to limit inward movement of said brush block, and split drums providing spaced diverging half rim peripheries, a resilient pad on said diverging half rims having said rasp band circumscribing the same, said pad being expandable upon movement of said diverging half rims toward each other, each said split drum having an inwardly offset hub portion of combined length to fit upon said shaft between the threaded end of the latter and said adapter with the hub portion of the inner one of said split drums engaging said brush block, and a retaining nut on the threaded end of said shaft for urging said split drums together for expanding said pad against said rasp band and for simultaneously clamping said brush block between the hub of said innermost split drum and said shoulder flange on said adapter.

2. For an existing arbor shaft having a base end providing a shoulder and a threaded end spaced from such shoulder for receiving and supporting either a buffing drum or a buffing brush only between said shoulder and a retaining nut on the threaded end of said shaft; a dual mount for mounting both a brush block and a rasp band on such existing arbor shaft comprising a bushing adapted to receive and support said brush block on the base end of said shaft and having a shoulder flange spaced inwardly of the shoulder on said shaft for abutting said brush block to limit inward movement of the latter on said bushing, and a split drum comprising an inner and an outer half drum each having an axial bore at its hub zone for sliding fit upon said shaft, said inner half drum having its hub portion engaging the brush block for pressing the latter toward said shoulder flange, said inner and outer half drum having diverging rasp band supporting peripheries offset outwardly from their hubs to provide a V groove centered beyond the unthreaded extremity of said shaft, a rasp band circumscribing said rasp band supporting peripheries of said half drums, and a resilient pad in said V groove for supporting said rasp band and expandable against the latter when said retaining nut is tightened onto the threaded end of said shaft to force said half drums together and for pressing the inner end of the hub of said inner half drum against said brush block.

3. For an existing arbor shaft having a base end providing a shoulder and a threaded end spaced from such shoulder for receiving and supporting either a buffing drum or a buffing brush only between said shoulder and a retaining nut on the threaded end of said shaft; a dual mount for mounting both a brush block and a rasp band on such existing arbor shaft comprising an adapter bushing keyed on the base end of said shaft and having a shoulder flange spaced inwardly of the shoulder on said shaft for limiting inward movement of said brush block relative to said shaft when the said brush block is mounted on said bushing, and a split drum comprising an inner and an outer half drum each having an axial bore at its hub zone for sliding fit upon said shaft, said inner half drum having a recess formed at the inner end of its hub for sliding fit over a portion of said bushing for engaging the brush block thereon to thereby press the latter toward said shoulder flange, said inner and outer half drum having diverging rasp band supporting peripheries offset outwardly from their hubs to provide an openable and closeable V groove centered beyond the unthreaded extremity of said shaft, a rasp band circumscribing said rasp band supporting peripheries of said half drums, and a resilient pad in said V groove supporting said rasp band and expandable against the latter when said retaining nut is tightened onto the threaded end of said shaft to press said half drums together and the inner end of the hub of said inner half drum against said brush block.

4. For an existing arbor shaft having a base end providing a shoulder and a threaded end spaced from such shoulder for receiving and supporting either a buffing drum or a buffing brush only between said shoulder and a retaining nut on the threaded end of said shaft; means for mounting both a brush block and a rasp band on such existing arbor shaft comprising an adapter bushing on the base end of said shaft adapted to receive said brush block and having a shoulder flange spaced inwardly of the shoulder on said shaft for abutting the brush block mounted on said bushing, and a split drum comprising a base cone and a companion cone each having an axial bore at its apex hub zone for sliding fit upon said shaft, said base cone having a recess formed at the inner end of its hub for sliding fit over a portion of said bushing and to provide an inner annular flange engaging said brush block for pressing the latter toward said shoulder flange, said base and companion cone being spaced axially of each other and presenting diverging rasp band supporting peripheries to provide an openable and closeable V groove offset outwardly from the hub portions of said cones, each said cone having a marginal flange outside the diverging periphery thereof, said rasp band circumscribing said rasp band supporting peripheries of said base and companion cones, and a resilient pad in said V groove supporting said rasp band and expandable against the latter when said diverging peripheries and cones are forced together by said retaining nut as it is tightened onto the threaded end of said shaft to compress said pad between the marginal flanges of said cones and to clamp said brush block between the inner annular flange on the hub of said base cone and the shoulder flange on said bushing.

5. For an existing arbor shaft having a base end providing a shoulder and a threaded end spaced from such shoulder for receiving and supporting either a buffing drum or a buffing brush only between said shoulder and a retaining nut on the threaded end of said shaft; a dual mount for mounting both a brush block and a rasp band on such existing arbor shaft comprising a cup-like brush block supporting bushing on the base end of said shaft and having a shoulder flange spaced inwardly of the shoulder on said shaft for abutting the brush block mounted on said bushing, and half drums comprising a base cone and a companion cone each having an axial bore at its hub zone for sliding fit upon said shaft, said base cone having a recess formed at the inner end of its hub receiving portion of said bushing and for engaging the brush block thereon for pressing the latter toward said shoulder flange, said base and companion cone having a half rim periphery spaced from and slanting toward each other and each provided with an outer retaining flange at its high side to provide an openable and closeable V groove offset from the apex hubs of said cones and centered substantially beyond the unthreaded extremity of said shaft, a rasp band circumscribing the half rim peripheries of said cones, and a resilient pad in said V groove supporting said rasp band and expandable against the latter when said V groove is closed upon tightening of said retaining nut upon the threaded end of said shaft for pressing said pad between said outer retaining flanges of said cones and for pressing the inner end of the hub of said base cone against said brush block.

References Cited in the file of this patent

UNITED STATES PATENTS

| | | |
|---|---|---|
| 1,871,007 | Raisch | Aug. 9, 1932 |
| 2,243,707 | James | May 27, 1941 |
| 2,570,540 | Furnald | Oct. 9, 1951 |
| 2,810,994 | Schmidt | Oct. 29, 1957 |
| 2,813,328 | Tobey | Nov. 19, 1957 |
| 2,990,862 | Ruben | July 4, 1961 |